Patented July 17, 1951

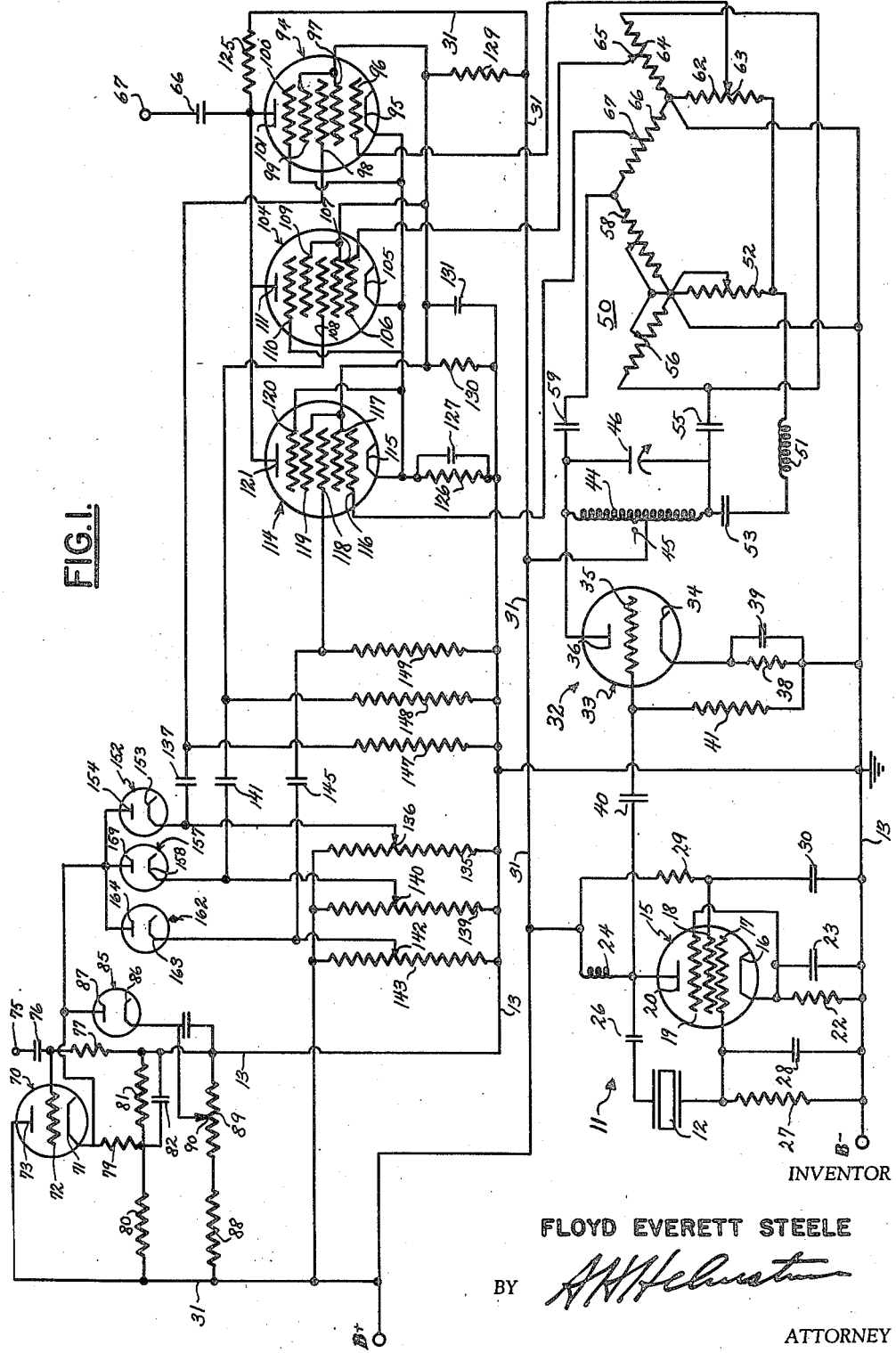

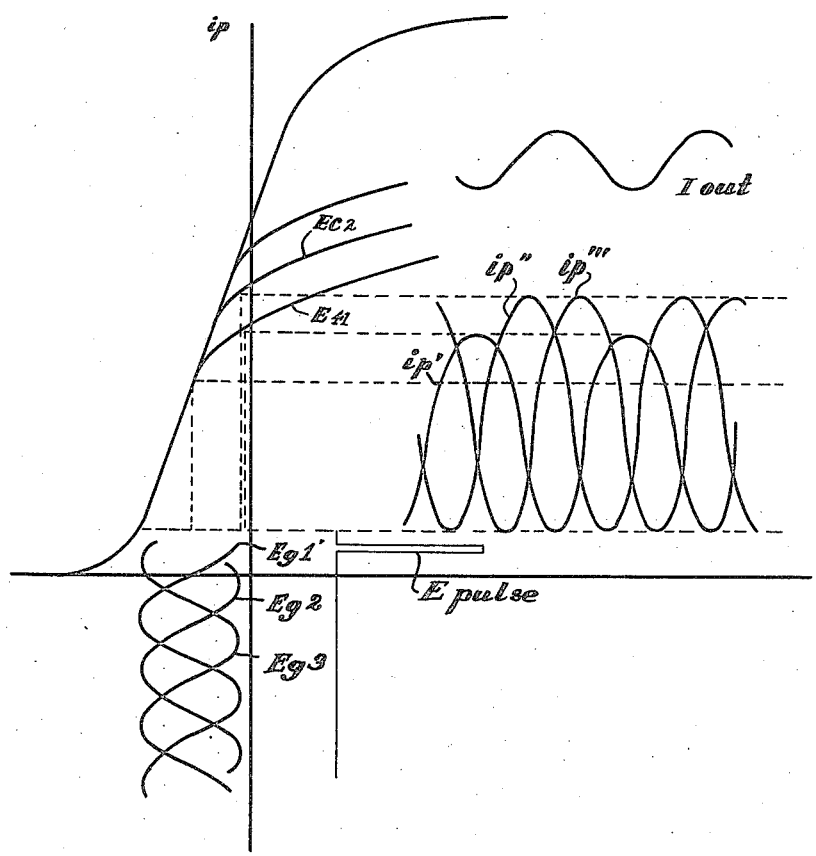

2,560,607

UNITED STATES PATENT OFFICE 2,560,607

CRYSTAL CONTROLLED CALIBRATOR FOR SELF-PULSED RADAR

Floyd Everett Steele, Yakima, Wash.

Application December 30, 1949, Serial No. 136,131

5 Claims. (Cl. 250—36)

(Granted under the act of March 3, 1883, as amended April 30, 1928; 370 O. G. 757)

The present invention relates to an automatic circuit for synchronizing a continuously operating sinewave generator with a pulse generator having an unstable pulse rate.

Presently available radar circuits employing range markers applied to the range-indicating oscilloscope must be equipped with marker-producing oscillator circuits which may be stopped and restarted with each transmitter pulse to insure accurate coincidence of the marker pulse with the transmitted pulse. In order to produce an oscillator which starts and stops readily, it is necessary to employ relatively low quality circuits to reduce the persistence of the oscillation and to enable the oscillator to quickly reach its peak amplitude. However, such oscillators are not highly stable because of the low quality circuits, and since the accuracy of the instrument depends upon the accuracy of the marker oscillator, the entire system is impaired. Similar situations exist in present television receivers, where the scanning circuits are synchronized periodically by a transmitted pulse from the transmitter.

The present invention permits the use of a highly stable oscillator employing high quality circuits with an unstable pulse generator by operating the stable oscillator continuously and adjusting the phase of the oscillator output with respect to the pulse by means of the pulse voltage itself. The output of the oscillator is provided with a phase-shifting network to produce a polyphase output. The several phase voltages are applied to the first control grids of a group of pentagrid convertor tubes, there being one such tube for each phase. The potential applied to the second control grid controls the saturation of the associated tube and hence its effective amplification factor. The potential of the second control grids is created by applying the pulse voltage as a positive pulse to the second control grids by individual circuits each containing condensers which are charged by the current flowing in the individual grid circuit. However, the instantaneous voltages applied to the first control grids control the conduction of the associated tubes and hence the charging rate of the several condensers. The pentagrid converters are operated in parallel with each other, and since the instantaneous voltages in a polyphase circuit are always equal to zero, the combined plate current of the pentagrid tubes is constant, where the amplification factor of the tubes is the same. However, the application of unequal voltages to the second control grids unbalances the amplification factors and produces an output current change of a phase depending upon the relative charges on the several second control grids, and as already explained, the relative charges are controlled by the instantaneous voltages applied to the first control grid at the time the pulse is generated. Thus, the circuit automatically adjusts the phase of its output current to correspond to that of the pulse voltage.

It is an object of the present invention to provide an automatic synchronizing circuit which will maintain the output of a continuously-running oscillator in phase with a series of pulse signals.

It is a further object of the present invention to provide a highly stable oscillator whose output phase is automatically controlled by an external pulse voltage.

It is a still further object of the present invention to provide an automatic electronic phasing system.

Further objects and advantages of the present invention will be made more apparent by reference to the following specification and to the appended drawings in which Figure 1 is a schematic wiring diagram of the present invention; and Figure 2 is a graph illustrating the operation of the circuit of the present invention.

Referring now to Figure 1 of the drawings, the oscillator may be of any type producing an highly stable sinewave output of the desired frequency. In certain special cases, a rotating machine may be useful, although an electronic oscillator will usually be preferred and is therefore illustrated in the present application, although those skilled in the art will realize that the invention is not limited thereto. Any form of highly stable oscillator is suitable although the crystal oscillator or the electron coupled oscillator are particularly suited, a Pierce type crystal oscillator being illustrated because it requires no resonant circuits other than the crystal 12. The oscillator tube 15 is a pentode having its cathode 16 connected to the negative plate lead 13 through a cathode biasing resistor 22 bypassed by a capacitor 23 in the usual manner and its plate 20 connected to the positive plate lead 45 through a radio frequency choke coil 24. The crystal 12 is connected between the plate 20 and the grid 17, a direct current blocking condenser 26 being inserted in series with the crystal, and the grid is connected to the negative plate lead 13 through a resistance 27 bypassed by the condenser 28. The suppressor grid 19 is connected to the cathode 16, and the screen grid 18 is supplied with power from the positive plate lead 31 through a voltage dropping resistor 29. A by-pass condenser 30 is connected between the screen grid 18 and the negative lead 13 to remove alternating currents therefrom. The voltage impressed on the crystal causes it to deform and to control the oscillation of the tube 15 at a frequency dependent upon its physical dimensions. Since the operation of this circuit is well-known, it will not be further described.

It will be apparent to those skilled in the art that the number of phases employed in the present circuit is a matter of design, and may be any number more than one. The operation of the synchronizing circuits is remotely similar to the revolving field of an induction motor, and polyphase circuits which would produce a revolving field will also function here. For the purposes of illustration, a three phase circuit is employed herein which is composed of three equal voltages separated from each other by 120 electrical degrees.

A buffer amplifier 32 is employed to isolate the oscillator circuit 11 from the synchronizing circuit so as to provide more stable operation and a more powerful output. Its output circuit is also employed as the input circuit to the phase shifter circuit 50.

The amplifier tube 33 may be a pentode, a screen grid tube, or a triode, and serves to increase the amplitude of the signal from the oscillator 11 and to isolate the oscillator from the remainder of the circuit insofar as loading is concerned. The cathode 34 of the tube 33 is connected to the negative plate lead 13 through a biasing resistor 38 and by-pass condenser 39 in the usual manner, and the grid is connected to the oscillator plate 20 through a coupling condenser 40 to receive a signal therefrom, and a grid resistor 41 is connected between the grid 35 and the negative plate lead 13. The plate 36 of the amplifier tube 33 is connected to one end of a center-tapped inductance 44 paralleled by a capacitance 45 of a size to cause the circuit to resonate at the oscillator frequency, the center tap 45 of the inductance being connected to the positive plate lead 31.

It will be appreciated that the ends of the inductance coil 45 are at opposite radio frequency potentials. In order to provide three voltages which are 120 electrical degrees apart, a series circuit comprising an inductance 51 and a variable resistance 52 is connected between one end of the inductance 44 by a small coupling condenser 53 and the negative plate lead 13 to cause the current therethrough to lag the voltage applied to it by about 60°. A second series circuit comprising a fairly large capacitance 55 and the variable resistance 56 is connected between the same end of the inductance 44 and the negative plate lead to cause the current therethrough to lead the voltage applied to the circuit by about 60°. A variable resistance 58 is connected between the opposite end of the inductance 44 and the negative plate lead 13 through a small coupling condenser 59, the current through the resistance 58 being substantially in phase with the voltage applied across the circuit. The variable resistances 52, 56 and 58 are adjusted to produce currents through the variable resistances which are spaced from each other by 120 electrical degrees.

In order to provide means for balancing the voltages produced across the three variable resistances 52, 56, and 58, three high resistance potentiometers 62, 64, and 66 having movable arms 63, 65, and 67 are respectively connected in parallel with the variable resistances. The movable arms 62, 64, and 66 are adjusted to produce equal voltages between the respective arms and the negative plate lead 13, the phase position of the voltages being adjusted by the variable resistances 52, 56, and 58 as previously mentioned.

The pulse with which it is desired to synchronize the oscillator 11 is applied as a positive voltage through a differentiating circuit comprising a small condenser 76 in series with a resistor 77, the voltage across the resistor 77 being impressed between the grid 72 and the negative plate lead 13. A voltage divider circuit comprising the resistances 80 and 81 proportioned to bias the cathode sufficiently positive with respect to the grid to maintain the tube normally cut off is connected between the negative plate lead 13 and the positive plate lead 31, the junction of resistors 80 and 81 being connected to the cathode 71 of the tube 70 through the cathode resistor 79. The capacitor 82 is bridged across the resistance 81 to maintain the cathode potential substantially constant. The plate 73 is connected to the positive plate lead 31.

The output pulse from the tube is a positive pulse of very short duration appearing across the resistor 79, the negative pulse being eliminated by biasing the tube 70 to cut off. This output pulse is applied across a diode rectifier 85 having its plate 87 connected to the cathode 71 of tube 70. A voltage divider consisting of the fixed resistor 88 and the potentiometer 89 having an arm 90 is connected between the negative plate lead 13 and the positive plate lead 31, with the potentiometer connected to the negative plate lead 13. The arm is connected to the cathode 86 of the diode 85 to provide a threshold bias, a capacitor 91 being connected between said arm and the negative plate lead 13 to maintain the bias substantially constant. The threshold bias is adjusted to a voltage equal to the desired pulse voltage thus setting the positive limit to a value which should be slightly less than the minimum pulse voltage. Thus the amplitude of the pulse from the tube is independent of the synchronizing pulse amplitude.

The synchronizing action of the present circuit is performed by a plurality of pentagrid converter tubes of the type normally employed as frequency converters in superheterodyne radio receivers, as the 6L7 tube. Such tubes are composed of a cathode, a first grid and a first screen grid which function as a separate tube insofar as the control of the cathode current by the grid is concerned, a second control grid, a second screen grid connected to the first control grid, a suppressor grid connected to the cathode and a plate. Because of the position of the screen grids between the cathode and the anode, changes in the anode potential do not affect the current flowing from the cathode of the tube which are dependent upon the voltage applied to the screen grid and the instantaneous potential of the grid relative to the cathode. Most of the electron stream can pass through the first and second screen grids to the anode when a positive charge is applied to the second control grid, but when a negative charge is applied to the second control grid, the electrons are slowed down and collected by the screen grid rather than the anode to a degree which depends upon the charge on the second control grid. When a negative charge is applied to the second control grid the electrons available for the cathode-anode circuit of the tube is greatly reduced so that the cathode-anode circuit behaves in a manner very similar to saturation in the ordinary tube which reduces the amplification factor of the tube at the more positive end of the grid swing of the first control grid. However, the amplification factor at the more negative end of the first control grid serving is not materially affected.

It will also be appreciated that the second control grid will when positively charged with respect to the cathode conduct current in proportion to its positive charge and that the conduction of the second control grid will be controlled by the potential of the first control grid relative to the cathode in a manner analogous to ordinary triode tube action. Thus, if a condenser is connected to the second control grid and the cathode and charged from a predetermined positive voltage of relatively short duration, the resultant charge on the condenser will be controlled by the instantaneous potential on the first control grid, the charge of course slowly leaking off in accordance with the time constants of the condenser circuit. However the charge may be maintained substantially constant for an appreciable period of time at least equal to the pulsing time of the synchronizing signal.

The three pentagrid converters 94, 104, 114 have their plates 101, 111, and 121 connected together and their cathodes 95, 105, and 115 connected together. The plates are connected through a plate resistor 125 to the positive plate lead 31 and the cathodes are connected through the resistor 126 by-passed by the condenser 127 to the negative plate lead 13, the resistor 126 being proportioned to bias the tubes for class A operation. The screen grids 97, 99, 107, 109, 117, and 119 are connected together and supplied with voltage through the junction of the voltage divider comprising resistances 129 and 130 connected between the positive and negative plate leads, the resistor 130 being by-passed by the capacitor 131 and connected to the negative plate lead 13.

The first control grids 96, 106, and 116 are connected to the movable arms 63, 65, and 67 respectively of the potentiometers 62, 64, and 66, so that the resepective voltages appearing between the movable arms and the negative plate lead 13 are individually and respectively impressed on the said control grids and control the conductivity of the associated tubes. The tubes being operated as class A amplifiers and having equal voltages equal phase angles apart, the current through the plate resistor 125 is constant, so long as the potential on each of the second control grids 98, 108, 118 is the same.

The potential of the second control grids 98, 101, and 118 is controlled by a condenser-resistance network and the positive pulse produced between the cathode 71 of tube 70 and the negative plate lead 13. A reference voltage for each second control grid is provided from three individualized potentiometers 135, 139, and 143 connected in parallel with each other, one end of the parallel connection being connected to the positive plate lead 31 and the other end of the parallel connection is connected to the negative plate lead 13, the individualized reference voltage appearing between the negative plate lead and the movable arms 136, 140, and 144. The movable arms 136, 140, and 144 are individually connected to one side of capacitors 137, 141 and 145 respectively, the other sides of the capacitors being connected to the second control grids 98, 108, and 118 also respectively. High resistances 147, 148, and 149 are respectively connected between the second control grids 98, 108, and 118 and the negative plate lead 13 to provide a very high resistance leakage path for the capacitors 137, 141, and 145.

Also connected to the movable arms 136, 140, and 144 are the respective cathodes 153, 158, and 163 of three individualized diode rectifiers 152, 157, and 162. The anodes 154, 159, and 164 of the diode rectifiers are connected together and to the cathode 71 of tube 70 to receive a positive pulse therefrom.

The output from the pentagrid converter tubes is taken off by means of a condenser 166 from the plates 101, 111, and 121 and an output terminal 167 is provided.

The operation of the circuit shown in Figure 1 is as follows. The oscillator 11 produces an alternating voltage which is amplified by the tube 33 and divided into a balanced three phase voltage which is applied to the first control grids of three pentagrid converted tubes. A periodic pulse voltage is connected to the input terminal 75, and impressed on the condenser 76 connected to the grid 72. As the grid 72 becomes more positive, the voltage across the cathode resistor rises sharply and causes the limiter tube 85 to conduct when the voltage exceeds a predetermined value controlled by setting on the movable arm 90 on potentiometer 89, thus providing a positive pulse of a predetermined voltage and of a duration controlled by the wave form of the impressed pulse and the values of the resistance 77 and condenser 76. These positive pulses are individually impressed on three condensers 137, 141, and 145 through individual diode rectifiers 152, 157, and 162. The three condensers are individually connected to a source of reference voltages and the other side of the condensers 137, 141, and 145 are connected to the second control grids 98, 108, and 118. The condensers 137, 141, and 145 are normally charged to a potential equal to the reference voltage.

When the positive pulse is applied to the condensers 137, 141, and 145, the second control grids 98, 108, and 118 are also made positive with respect to the cathodes 95, 105, and 115 and therefore draw electrons from the cathodes to increase the charge on the condensers. The rate at which each condenser is charged depends upon the space charge in the associated tube which in turn is controlled by the potential on the first control grid from the oscillator. Thus, the tube having the least negative first control grid charges the condenser connected to its second control grid at the fastest rate, and since the duration of the positive pulse is insufficient to completely charge the condenser, the voltage across the condenser is also largest.

At the end of the positive pulse, the voltage applied to the condensers returns to that of the reference voltage, and the second control grids are negatively biased by the amount the charge on the respective condensers has been increased during the pulse, so that the amplification factors of the tubes is no longer equal and an output voltage appears across the plate resistor 125 of the frequency of the oscillator and of a phase determined by the individual condenser charges.

The operation of the circuit may be readily understood by reference to Figure 2, which shows a curve the first control grid bias vs. plate current in the tubes. The curves $Eg_1$, $Eg_2$, $Eg_3$ represent the voltages impressed on the first control grids 96, 106, and 116 from the phase shift network and are displaced in a negative direction from the ordinate by an amount equal to the grid bias produced by the resistance 126, and the curve E pulse represents the positive voltage pulse from the cathode resistor 79. For the purposes of illustration the pulse is shown as being applied when the voltage $Eg_1$ is least negative, although it will be clear that the result will be the same regardless of the phase position.

The charge on the condenser 137 will be greater than the charge on the condensers 141 and 145, because the voltage $Eg_1$ is more positive, and at the end of the pulse, the tube 94 will operate on the characteristic curve $Ec_1$, while the tubes 104 and 114 will operate on the curve $Ec_2$ since the voltages $Eg_2$ and $Eg_3$ were the same during the pulse E pulse. However, had the voltages $Eg_2$ and $Eg_3$ been of any other values the characteristic amplification curve Ec for each tube will be higher or lower than that shown in the present illustration, and will be determined by the instantaneous charges Eg on the first control grids at the time the voltage E pulse is applied to the second control grids.

If the voltages $Eg_1$, $Eg_2$, and $Eg_3$ are projected vertically to the corresponding characteristic curves $Ec_1$, $Ec_2$, and $Ec_3$ and then horizontally, the curves $Ip_1$, $Ip_2$, and $Ip_3$ result, which curves represent the current drawn by the plates 101, 111, and 121 respectively. The sum of the currents $Ip_1$, $Ip_2$, and $Ip_3$ passes through the output resistor 125, and is represented by the curve I out, which is 180 degrees out of phase and with the voltage E pulse. However, the plate voltages on the plates 101, 111, and 121 are reduced as the current increases, and thereby produces a voltage which is in phase with the voltage E pulse.

The output voltage of the synchronizer circuit may be amplified and shaped to produce the required wave form. It may be amplified to a large amplitude and clipped to produce an approximately square wave, and if desired, a differentiating circuit connected thereto to supply a series of sharp pulses of the same frequency as that of the oscillator of each polarity. Wave-shaping techniques are, of course, well known to those skilled in the art, and are therefore omitted from further description.

It will be obvious that many changes are possible in the present circuit. The several adjustable elements may obviously be replaced by fixed elements of the correct values, and any desired type of sinewave generator may be employed. There are several types of phase shifters in widespread use today, and any desired type may be easily substituted, the type shown being simple and therefore easily understood.

The pulse input circuit is merely illustrative and may be varied if desired. The use of a limiter stage is desirable, although it may be omitted where the pulses are sufficiently uniform. Germanium crystal detectors are suitable for use in the place of diode rectifiers where it is desirable to reduce the power requirements of the equipment.

The device herein described may be manufactured and used by or for the Government of the United States of America without the payment of any royalty therefor or thereon.

Having thus described the present invention, what is claimed is:

1. In a circuit for synchronizing a sinewave voltage with a pulse voltage, a source of polyphase sinewave voltage composed of a plurality of equal phase voltages, a source of voltage pulses, a number of electronic tubes equal to the number of said phase voltages each having a cathode, an anode, and at least a first and a second control grids, circuit means for said cathodes and said anodes to a source of direct current, circuit means for impressing each of said phase voltages on one of said first control grids with respect to said cathodes respectively, and circuit means including capacitor means individual to each of said tubes for impressing said voltages pulses on said second control grids to charge said capacitor means through the respective tubes, whereby the potential applied to the second control grid of each of said tubes is determined by the instantaneous voltage impressed on the respective first control grid at the time said voltage pulse is impressed on said second control grids.

2. In a circuit for synchronizing a continuously operating oscillator with a voltage pulse signal, an oscillator, a phase shifting network connected to said oscillator to produce a plurality of equal phase voltages displaced from each other by equal phase angles, a source of voltage pulses, a number of electronic tubes equal to the number of said phase voltages each having a cathode, an anode, and at least a first and a second control grid, circuit means for connecting said cathodes and said anodes respectively together and to a direct current source, circuit means for impressing each of said phase voltages on a respective first control grid of a respective one of said electronic tubes, circuit means including capacitor means individual to each of said tubes for impressing said voltage pulse on said second control grids to charge said individualized capacitor means through the respective tubes, whereby the charge on each of said individualized capacitor means is determined by the instantaneous potentials impressed on said first control grid at the time the voltage pulse is impressed on said second control grids and controls the relative amplification of the associated electronic tube.

3. In a circuit for synchronizing a continuously operating oscillator with a source of voltage pulses having a random pulse rate, an oscillator, a phase shifting network connected to said oscillator to provide a plurality of equal phase voltages separated from each other by equal phase angles, a source of voltage pulses amplifying and limiting means to produce an operating pulse of predetermined amplitude in response to said voltage pulses, a number of electronic tubes equal to the number of said phase voltages each having an anode, a cathode, and at least a first and a second control grid, circuit means for connecting said cathodes together and said anodes together and to a source of direct current, circuit means for impressing each of said phase voltages on an individual one of said first control grids, and circuit means individual to each of said second control grids and including individualized capacitor means connected to said second control grids and to said amplifier and limiter means through a unidirectional conducting device to impress said operating pulse on said second control grid and charge said capacitor means through said tubes, whereby the voltage charge on each of said capacitors is determined by the instantaneous voltage applied to the corresponding first control grid at the instant the voltage pulse is applied to the second control grid and controls the amplification of the associated tube.

4. In a circuit for synchronizing a continuously operating oscillator with a voltage pulse generator having a random pulse rate, an oscillator, a phase shifting network for producing three equal phase voltages separated by phase angles of one hundred twenty degrees, a source of voltage pulses, an amplifying and limiting circuit for producing positive operating pulses of predetermined short duration and amplitude in response to a voltage pulse, three electronic tubes each having a cathode, an anode and at least a first and a second control grid, circuit means for connecting said cathodes together, said anodes together and energizing said anodes and cathodes from a source of direct current, circuit means for connecting each of said phase voltages to a respective first control grid of one of said electronic tubes, circuit means individual to each of said second control grids each comprising a capacitor connected between a source of direct current and said second control grid and a unidirectional conducting device connected between the junction of said source of direct current and said capacitor and said amplifying and limiter means to apply said operating pulse to said second control grid whereby to charge each of said condensers through the associated tube and negatively bias the second control grids by amount determined by the instantaneous voltages applied to the first control grids when the operating pulse is applied to the second control grid.

5. The device as claimed in claim 4 in which the amplifying and limiting consists of a cathode follower connected to said source of voltage pulses through a differentiating circuit followed by a diode limiting circuit.

FLOYD EVERETT STEELE.

No references cited.